No. 733,778. PATENTED JULY 14, 1903.
H. F. WEBER.
BIRD CHASER.
APPLICATION FILED NOV. 6, 1902.
NO MODEL.
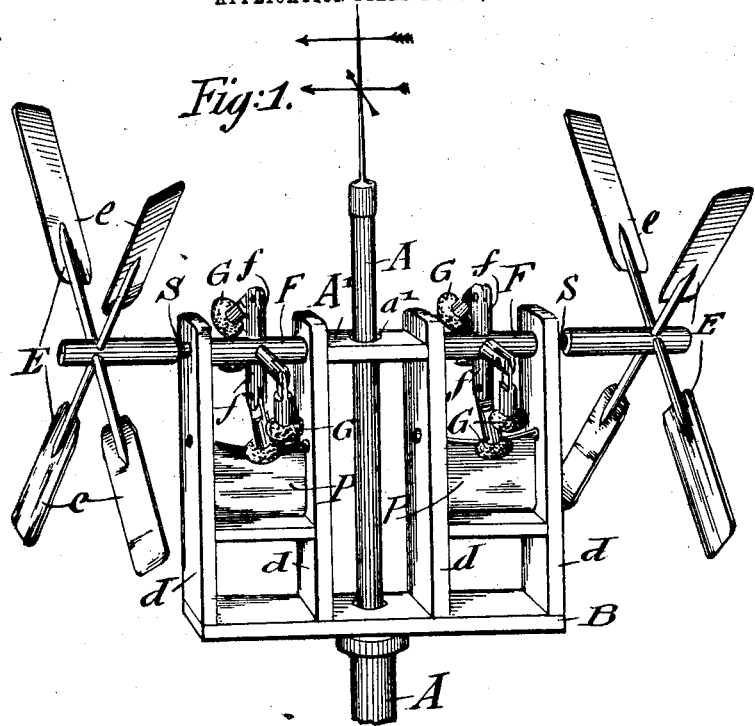
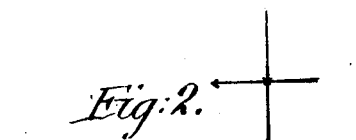

No. 733,778. Patented July 14, 1903.

UNITED STATES PATENT OFFICE.

HEINRICH F. WEBER, OF NEW YORK, N. Y.

BIRD-CHASER.

SPECIFICATION forming part of Letters Patent No. 733,778, dated July 14, 1903.

Application filed November 6, 1902. Serial No. 130,286. (No model.)

*To all whom it may concern:*

Be it known that I, HEINRICH F. WEBER, a citizen of the Empire of Germany, residing in New York, borough of Manhattan, and State of New York, have invented certain new and useful Improvements in Bird-Chasers, of which the following is a specification.

It is a well-known fact that dummy figures or scarecrows are not very effective in chasing birds away from orchards, cultivated fields, &c., as the birds soon get accustomed to the figure and are not kept away by the same. It is different, however, when a body is used that is kept in motion and which makes some noise at the same time. So it requires the combination of motion and noise to drive away the birds and protect thereby fruit-trees, cultivated fields, &c., against harm done by picking and consequent injuring the same by birds.

The object of this invention is to furnish an improved device in which motion and noise is combined for keeping birds away from fruit-trees, cultivated fields, &c., so that it may serve in a reliable manner the function of a bird-chaser, for which purpose the invention consists of a bird-chaser which comprises an upright supporting post or standard, a turn-table supported on said post and adapted to rotate thereon, a pair of upright standards supported on said turn-table, a horizontal shaft supported in bearings of said standards, a propelling-wheel at each end of the shaft, sleeves placed on the inner ends of the shaft, radial arms on said sleeves, clappers pivoted to said arms, and a sounding-plate pivoted to said standards below each shaft and placed in the path of the clappers, so as to be sounded by the blows of the same as they are moved past said sounding-plate.

The invention consists, further, of the combination, with the supporting-post and rotary standard and individual clapper sound-producing mechanisms on said turn-table, of a connecting-brace between the standards adjacent to the post, said connecting-brace being provided with a hole for the post, so as to steady the rotary motion of the bird-chasing device on the post, as will be fully described hereinafter and finally pointed out in the claims.

In the accompanying drawings, Figure 1 represents a perspective view of my improved bird-chasing device, and Fig. 2 is a side elevation of one of the bird-chasing devices drawn on a larger scale.

Similar letters of reference indicate corresponding parts.

Referring to the drawings, A represents an upright post, which is set into the ground and made of such height that the bird-chasing device supported thereon is of sufficient height so as not to be interfered with—*i. e.,* at a height from eight to twelve feet above the ground. The bird-chasing devices proper are supported on a platform or turn-table B, which is supported on antifriction-bearings of a collar $r$ of the post A, so as to rotate with as little friction as possible, and which carries two bird-chasing devices that are made of the same construction, but arranged in line with each other at diametrically opposite sides of the post and turn-table, so as to be symmetrical and balance each other, so that a free motion is imparted to the device around the post according to the direction of the wind.

Each bird-chasing device is constructed of two pairs of upright standards $d\,d$, that are attached to the turn-table, one pair of standards being arranged at one side and the other pair at the other side of the post, and equidistantly therefrom the upper ends of the inner standards adjacent to the post are connected by a strong brace A', which is provided with an opening $a'$ for the post, so that the motion of the turn-table and bird-chasing device upon the same around the post is steadied. In each pair of standards is supported at its upper end a horizontal shaft S S, which carries at its outer end a propelling-wheel E, that is formed of radial wings or blades $l$, set at a suitable angle of inclination to the axis of the shaft and which when rotated by the wind imparts rotary motion to the shafts S. On the middle portion of the shaft, between the standards $d\,d$, is arranged a sleeve F, which is attached to the shafts by screws or otherwise and which is provided with a number of radial arms $f$, to the outer recessed ends of which are pivoted the shanks of the clappers G. Below the shaft S is arranged a sounding-plate P, which is pivoted at its upper corners to the standards $d\ d$, said sounding-plate being made of greater or less thickness, according to the pitch of the sounds to be produced by the blows of the clappers on the same. The motion imparted to the shafts by the propelling-vanes $e$ causes the clappers to strike the sounding-plates so as to produce by the successive blows on the same a series of clapper sounds, which increase in rapid succession with the increase of the velocity of the wind and decrease in rapidity of succession when the velocity of the wind decreases. The rotary motion of the propelling-wheel in connection with the clapper-sounds produced by the blows or strokes of the clappers on the sounding-plates together serve as a scare for birds and chases them away from fruit-trees, grain-fields, or other objects that are to be protected against the birds. As the bird-chasing devices balance each other and as they are turned in the direction of the wind by the turn-table on which they are mounted, they will be actuated and sounded even when there is a light breeze, while with increasing wind the motion and sounds are increased, so as to form a protecting device against birds that is always in motion and operation except when there is absolutely no wind at all.

The improved bird-chasing device can be made of wood and sheet metal, so as to combine lightness and durability with a neat appearance. After the fruit, grain, or other articles to be protected are harvested the bird-chasing device is bodily removed from the post and placed under shelter during the winter season until required again in the summer season, when the bearings of the shaft are lubricated and the entire device replaced on the post ready to assume its work of chasing the birds.

Having thus described my invention, I claim as new and desire to secure by Letters Patent—

1. A bird-chasing device, consisting of an upright post, a turn-table supported on said post, two bird-chasing devices arranged symmetrically to said post on said turn-table, each being composed of a pair of upright standards, a horizontal shaft supported in bearings of said standards, a propelling-wheel at the outer end of said shaft, a sleeve on the middle portion of said shaft between the two upright standards, said sleeve being provided with a number of radial arms, clappers pivoted to said arms, and a sounding-plate below the shaft pivoted to and between said standards and placed in the path of the clappers so as to be sounded by the same, substantially as set forth.

2. In a bird-chasing device, the combination with an upright post, of a platform or turn-table supported on the same, two bird-chasing devices arranged symmetrically to said post on said turn-table, a steadying-brace connecting the upper ends of said bird-chasing devices and provided with an opening for the post, each bird-chasing device being provided with a rotary shaft, a sleeve on the middle portion of the shaft, sound-producing devices on said sleeve, a propelling-wheel on said shaft, and a sounding-plate pivoted below the shaft in the path of said sound-producing devices, substantially as set forth.

In testimony that I claim the foregoing as my invention I have signed my name in presence of two subscribing witnesses.

HEINRICH F. WEBER.

Witnesses:
PAUL GOEPEL,
HENRY J. SUHRBIER.